United States Patent [19]

Warzelhan et al.

[11] Patent Number: 5,880,220

[45] Date of Patent: Mar. 9, 1999

[54] BIODEGRADABLE POLYMERS, PROCESS FOR THE PREPARATION THEREOF AND THE USE THEREOF FOR PRODUCING BIODEGRADABLE MOLDINGS

[75] Inventors: Volker Warzelhan, Weisenheim; Gunnar Schornick, Neuleiningen; Frank Braun; Ursula Seeliger, both of Ludwigshafen; Motonori Yamamoto, Mannheim; Peter Bauer, Ludwigshafen, all of Germany

[73] Assignee: BASF Aktiengesellschaft, Ludwigshafen, Germany

[21] Appl. No.: 860,027

[22] PCT Filed: Jan. 9, 1996

[86] PCT No.: PCT/EP96/00059

§ 371 Date: Jul. 3, 1997

§ 102(e) Date: Jul. 3, 1997

[87] PCT Pub. No.: WO96/21690

PCT Pub. Date: Jul. 18, 1996

[30] Foreign Application Priority Data

Jan. 13, 1995 [DE] Germany .................. 195 00 755.7

[51] Int. Cl.⁶ .............................. C08G 69/40; C08G 69/44
[52] U.S. Cl. .................... 525/424; 525/434; 525/440; 525/448; 528/288; 528/290; 528/291; 528/292; 528/301; 528/302
[58] Field of Search .................... 528/288, 290, 528/291, 292, 301, 302; 525/424, 434, 440, 448

[56] References Cited

U.S. PATENT DOCUMENTS

| | | |
|---|---|---|
| 3,803,259 | 4/1974 | Porchey et al. . |
| 4,328,049 | 5/1982 | Richardson . |
| 4,328,059 | 5/1982 | Horlbeck et al. . |
| 5,171,308 | 12/1992 | Gallagher ............................... 528/302 |
| 5,455,311 | 10/1995 | Grigat .................................... 525/439 |

FOREIGN PATENT DOCUMENTS

| | | |
|---|---|---|
| 7 445 | 2/1980 | European Pat. Off. . |
| 13 461 | 7/1980 | European Pat. Off. . |
| 21 042 | 1/1981 | European Pat. Off. . |
| 28 687 | 5/1981 | European Pat. Off. . |
| 372 846 | 6/1990 | European Pat. Off. . |
| 515 203 | 11/1992 | European Pat. Off. . |
| 534 295 | 3/1993 | European Pat. Off. . |
| 565 235 | 10/1993 | European Pat. Off. . |
| 818 157 | 8/1959 | United Kingdom . |
| 1115512 | 5/1965 | United Kingdom . |
| 1010916 | 11/1965 | United Kingdom . |
| 1164331 | 9/1969 | United Kingdom . |
| 90/05161 | 5/1990 | WIPO . |
| 92/00441 | 1/1992 | WIPO . |
| 92/13019 | 8/1992 | WIPO . |

OTHER PUBLICATIONS

Handbook of Polymeric foams . . . , Shutov, 375–408, 1991.
Adhesive Comp., pp. 547–577, Encycl. of Polym. Sci. and Eng., vol. 1.
Kunststoff–Handbuch, Bd. 3/1, pp. 24–28, 1992.
J. of Appl. Polym. Sci., vol. 32, pp. 6191–6207, 1986.
Roempp Chem. Lexikon, Bd. 6, Ny, Aufl., pp. 4626–4633 and 5136–5143, 1992.
Sax Toxic Sub. Data Book, Fujiyama et al., p. 360.
B Fortunato et al., Poly, vol. 35, Nr. 18, pp. 4006–4010, 1994.
Enc of Poly. Sci and Eng., Bd. 12, 2nd Ed., pp. 1–75, 1988.
Kunststoff–Handbuch, Bd. 3/1, pp. 15–23, 1992, Muenchen.
Agnew. Chem. int. Edit., vol. 11, pp. 287–288, 1972.
Sorensen + Campbell, Prep. Methods of poly. Chem., Interscience Pub., pp. 111–127, 1961.
J. Biochem. vol. 59, p. 537, 1966.
Plant Cell Physiol., vol. 7, s. 93, 1966.
Agric. Biol. Chem., vol. 39, p. 1219, 1975.
J. of Apll. Poly. Sci., Bd. 24, pp. 1701–1711, 1979.
J. of Appl. Poly. Sci., Bd., 26, pp. 441–448, 1981.
Y. Tokiwa et al., Nature, Bd. 270, pp. 76–78, 1977.

*Primary Examiner*—Patricia A. Short
*Attorney, Agent, or Firm*—Keil & Weinkauf

[57] ABSTRACT

Biodegradable polyetheresteramides P1 which are obtained by reacting
(a1) a mixture containing
  20-95 mol % of adipic acid or ester-forming derivatives thereof or mixtures thereof and
  5-80 mol % of terephthalic acid or ester-forming derivatives thereof or mixtures thereof, and
(a2) a mixture of dihydroxy compounds
  (a21) from 15 to 99.3 mol % of a dihydroxy compound selected from the group consisting of $C_2$–$C_6$-alkanediols and $C_5$–$C_{10}$-cycloalkanediols,
  (a22) from 0.2 to 85 mol % of a dihydroxy compound containing ether functionalities of the formula I $$HO-((CH_2)_n-O)_m-H \qquad \text{I}$$

where n is 2, 3 or 4 and m is an integer from 2 to 250, or mixtures thereof and
  (a23) from 0.5 to 80 mol % of an amino-$C_2$–$C_{12}$-alkanol or amino-$C_5$–$C_{10}$-cycloalkanol,
where the molar ratio of (a1) to (a2) is from 0.4:1 to 1.5:1, with the proviso, inter alia, that the polyetheresteramides P1 have a molecular weight ($M_n$) in the range from 5000 to 80,000 g/mol, and biodegradable polymers, biodegradable moldings, and adhesives obtained from the disclosed polymers.

21 Claims, No Drawings

BIODEGRADABLE POLYMERS, PROCESS FOR THE PREPARATION THEREOF AND THE USE THEREOF FOR PRODUCING BIODEGRADABLE MOLDINGS

The present-invention relates to biodegradable polyetheresteramides P1 obtainable by reacting a mixture consisting essentially of (a1) a mixture consisting essentially of
  20–95 mol % of adipic acid or ester-forming derivatives thereof or mixtures thereof,
  5–80 mol % of terephthalic acid or ester-forming derivatives thereof or mixtures thereof, and
  0–5 mol % of a compound containing sulfonate groups,
  where the total of the individual mole percentages is 100 mol %, and (a2) a mixture of dihydroxy compounds consisting essentially of
  (a21) from 15 to 99.3 mol % of a dihydroxy compound selected from the group consisting of $C_2$–$C_6$-alkanediols and $C_5$–$C_{10}$-cycloalkanediols,
  (a22) from 0.2 to 85 mol % of a dihydroxy compound containing ether functionalities of the formula I

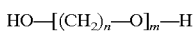

$$HO-[(CH_2)_n-O]_m-H \qquad I$$

where n is 2, 3 or 4 and m is an integer from 2 to 250, or mixtures thereof,
  (a23) from 0.5 to 80 mol % of an amino-$C_2$–$C_{12}$-alkanol or amino-$C_5$–$C_{10}$-cycloalkanol, and
  (a24) from 0 to 50 mol % of a diamino-$C_1$–$C_8$-alkane,
  (a25) from 0 to 50 mol % of a 2,2'-bisoxazoline of the general formula II

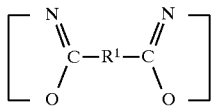

where $R^1$ is a single bond, a $(CH_2)_q$ alkylene group with q=2, 3 or 4, or a phenylene group, where the total of the individual mole percentages is 100 mol %,
  where the molar ratio of (a1) to (a2) is selected in the range from 0.4:1 to 1.5:1,
  with the proviso that the polyetheresteramides P1 have a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyether esteramides P1.

The invention furthermore relates to polymers and biodegradable thermoplastic molding compositions as claimed in the dependent claims, processes for the preparation thereof, the use thereof for producing biodegradable moldings and adhesives, biodegradable moldings, foams and blends with starch obtainable from the polymers and molding compositions according to the invention.

Polymers which are biodegradable, ie. decompose under environmental influences in an appropriate and demonstrable time span have been known for some time. This degradation usually takes place by hydrolysis and/or oxidation, but predominantly by the action of microorganisms such as bacteria, yeasts, fungi and algae. Y. Tokiwa and T. Suzuki (Nature, 270, (1977) 76–78) describe the enzymatic degradation of aliphatic polyesters, for example including polyesters based on succinic acid and aliphatic diols.

EP-A 565,235 describes aliphatic copolyesters containing [—NH—C(O)O—] groups (urethane units). The copolyesters of EP-A 565,235 are obtained by reacting a prepolyester, which is obtained by reacting essentially succinic acid and an aliphatic diol, with a diisocyanate, preferably hexamethylene diisocyanate. The reaction with the diisocyanate is necessary according to EP-A 565,235 because the polycondensation alone results only in polymers with molecular weights such that they display unsatisfactory mechanical properties. A crucial disadvantage is the use of succinic acid or ester derivatives thereof to prepare the copolyesters because succinic acid and derivatives thereof are costly and are not available in adequate quantity on the market. In addition, the polyesters prepared using succinic acid as the only acid component are degraded only extremely slowly.

WO 92/13020 discloses copolyether esters based on predominantly aromatic dicarboxylic acids, short-chain ether diol segments such as diethylene glycol, long-chain polyalkylene glycols such as polyethylene glycol (PEG) and aliphatic diols, where at least 85 mol % of the polyester diol residue comprise a terephthalic acid residue. The hydrophilicity of the copolyester can be increased and the crystallinity can be reduced by modifications such as incorporation of up to 2.5 mol % of metal salts of 5-sulfoisophthalic acid. This is said in WO 92/13020 to make the copolyesters biodegradable. However, a disadvantage of these copolyesters is that biodegradation by microorganisms was not demonstrated, on the contrary only the behavior toward hydrolysis in boiling water was carried out.

According to the statements of Y. Tokiwa and T. Suzuki (Nature, 270 (1977) 76–78 or J. of Appl. Polymer Science, 26 (1981) 441–448), it may be assumed that polyesters which are essentially composed of aromatic dicarboxylic acid units and aliphatic diols, such as PET (polyethylene terephthalate) and PBT (polybutylene terephthalate), are not enzymatically degradable. This also applies to copolyesters and copolyether esters which contain blocks composed of aromatic dicarboxylic acid units and aliphatic diols or ether diols.

Furthermore, Y. Tokiwa, T. Suzuki and T. Ando (J. of Appl. Polym. Sci. 24 (1979) 1701–1711) prepared polyesteramides and blends of polycaprolactone and various aliphatic polyamides such as polyamide-6, polyamide-66, polyamide-11, polyamide-12 and polyamide-69 by melt condensation and investigated them for biodegradability by lipases. It was found that the biodegradability of such polyesteramides depends greatly on whether there is a predominantly random distribution of the amide segments or, for example, a block structure. In general, amide segments tend to slow the rate of biodegradation by lipases.

However, the crucial factor is that no lengthy amide blocks are present, because it is known from Plant Cell Physiol. 7 (1966) 93, J. Biochem., 59 (1966) 537 and Agric. Biol. Chem. 39 (1975) 1219 that the usual aliphatic and aromatic polyamides are biodegradable at the most only when oligomers, otherwise not.

Witt et al. (handout for a poster at the International Workshop of the Royal Institute of Technology, Stockholm, Sweden, Apr. 21–23, 1994) described biodegradable copolyesters based on 1,3-propanediol, terephthalic ester and adipic or sebacic acid. A disadvantage of these copolyesters is that moldings produced therefrom, especially sheets, have inadequate mechanical properties.

It is an object of the present invention to provide polymers which are degradable biologically, ie. by microorganisms, and which do not have these disadvantages. The intention was, in particular, that the polymers according to the invention be preparable from known and low-cost monomer units and be insoluble in water. It was furthermore the intention that it be possible to obtain products tailored for the desired uses according to the invention by specific modifications such as chain extension, incorporation of hydrophilic groups and groups having a branching action. The aim was moreover that the biodegradation by microorganisms should not be achieved at the expense of the mechanical properties in order not to restrict the number of applications.

We have found that this object is achieved by the polymers and thermoplastic molding compositions defined at the outset.

We have furthermore found processes for the preparation thereof, the use thereof for producing biodegradable moldings and adhesives, and biodegradable moldings and adhesives obtainable from the polymers and molding compositions according to the invention.

The polyetheresteramides P1 according to the invention have a molecular weight ($M_n$) in the range from 5000 to 80,000, preferably from 6000 to 45,000, particularly preferably from 8000 to 35,000, g/mol, a viscosity number in the range from 30 to 450, preferably from 50 to 400, g/ml (measured in o-dichlorobenzene/phenol (50/50 ratio by weight) at a concentration of 0.5% by weight of polyetheresteramide P1 at 25° C.) and a melting point in the range from 50° to 200°, preferably from 60° to 180° C.

The polyetheresteramides PI are obtained according to the invention by reacting a mixture consisting essentially of
(a1) a mixture consisting essentially of
  20–95, preferably from 30 to 80, particularly preferably from 40 to 70, mol % of adipic acid or ester-forming derivatives thereof, in particular the di-$C_1$–$C_6$-alkyl esters such as dimethyl, diethyl, dipropyl, dibutyl, diisobutyl, dipentyl and dihexyl adipate, or mixtures thereof, preferably adipic acid and dimethyl adipate, or mixtures thereof,
  5–80, preferably 20–70, particularly preferably from 30 to 60, mol % of terephthalic acid or ester-forming derivatives thereof, in particular the di-$C_1$–$C_6$-alkyl esters such as dimethyl, diethyl, dipropyl, dibutyl, dipentyl or dihexyl terephthalate, or mixtures thereof, preferably terephthalic acid and dimethyl terephthalate, or mixtures thereof, and
  0–5, preferably from 0 to 3, particularly preferably from 0.1 to 2, mol % of a compound containing sulfonate groups,
  where the total of the individual mole percentages is 100 mol %, and
(a2) a mixture of dihydroxy compounds consisting essentially of
  (a21) from 15 to 99.3, preferably from 60 to 99.0, particularly preferably from 70 to 97.5, mol % of a dihydroxy compound selected from the group consisting of $C_2$–$C_6$-alkanediols and $C_5$–$C_{10}$-cycloalkanediols,
  (a22) from 0.2 to 85, preferably from 0.5 to 40, particularly preferably from 0.5 to 30, mol % of a dihydroxy compound containing ether functionalities of the formula I $$HO-[(CH_2)_n-O]_m-H \qquad I$$

where n is 2, 3 or 4, preferably two and three, particularly preferably two, and m is an integer from 2 to 250, preferably from two to 100, or mixtures thereof,
  (a23) from 0.5 to 80, preferably from 0.5 to 50, particularly preferably from 1 to 30, mol % of an amino-$C_2$–$C_{12}$-alkanol or amino-$C_5$–$C_{10}$-cycloalkanol, and
  (a24) from 0 to 50, preferably from 0 to 35, particularly preferably from 0.5 to 30, mol % of a diamino-$C_1$–$C_8$-alkane,
  (a25) from 0 to 50, preferably from 0 to 30, particularly preferably from 0.5 to 20, mol % of a 2,2'-bisoxazoline of the general formula II

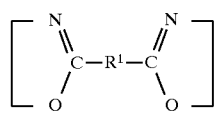

where $R^1$ is a single bond, a $(CH_2)_q$ alkylene group with q=2, 3 or 4, or a phenylene group, where the total of the individual mole percentages is 100 mol %,
  where the molar ratio of (a1) to (a2) is selected in the range from 0.4:1 to 1.5:1, preferably from 0.6:1 to 1.25:1.

The compound containing sulfonate groups which is normally employed is an alkali metal or alkaline earth metal salt of a dicarboxylic acid containing sulfonate groups, or the ester-forming derivatives thereof, preferably alkali metal salts of 5-sulfo-isophthalic acid or mixtures thereof, particularly preferably the sodium salt.

The dihydroxy compounds (a21) employed according to the invention are selected from the group consisting of $C_2$–$C_6$-alkanediols and $C_5$–$C_{10}$-cycloalkanediols, such as ethylene glycol, 1,2- and 1,3-propanediol, 1,2- and 1,4-butanediol, 1,5-pentanediol or 1,6-hexanediol, in particular ethylene glycol, 1,3-propanediol and 1,4-butanediol, cyclopentanediol, cyclohexanediol, 1,2-cyclohexanedimethanol, 1,4-cyclohexanedimethanol, particularly preferably ethylene glycol and 1,4-butanediol, and mixtures thereof.

The dihydroxy compounds (a22) which are preferably employed are diethylene glycol, triethylene glycol, polyethylene glycol, polypropylene glycol and polytetrahydrofuran (poly-THF), also mixtures thereof or compounds which have different n's (see formula I), for example polyethylene glycol which contains propylene units (n=3) for example obtainable by polymerization by conventional methods of initially ethylene oxide and subsequently with propylene oxide. The molecular weight ($M_n$) of the polyethylene glycol is usually chosen in the range from 250 to 8000, preferably from 600 to 3000, g/mol.

Preferably used as amino-$C_2$–$C_{12}$-alkanol or amino-$C_5$–$C_{10}$-cycloalkanol (component (a22)), these also being intended to include 4-aminomethylcyclohexanemethanol, are amino-$C_2$–$C_6$-alkanols such as 2-aminoethanol, 3-aminopropanol, 4-aminobutanol, 5-aminopentanol, 6-aminohexanol and amino-$C_5$–$C_6$-cycloalkanols such as aminocyclopentanol and aminocyclohexanol or mixtures thereof.

Preferably used as diamino-$C_1$–$C_8$-alkane are diamino-$C_4$–$C_6$-alkanes such as 1,4-diaminobutane, 1,5-diaminopentane and 1,6-diaminohexane (hexamethylenediamine, HMD).

The compounds of the general formula I (component (a24)) are obtainable as a rule by the process of Angew. Chem. int. Edit. 11 (1972) 287–288.

From 0 to 5, preferably from 0.01 to 4 mol %, particularly preferably from 0.05 to 4, mol %, based on component (a1), of at least one compound D with at least three groups capable of ester formation are used according to the invention.

The compounds D preferably contain three to ten functional groups capable of forming ester linkages. Particularly preferred compounds D have three to six functional groups of this type in the molecule, in particular three to six hydroxyl groups and/or carboxyl groups. Examples which may be mentioned are:

tartaric acid, citric acid, malic acid;
trimethylolpropane, trimethylolethane;
pentaerythritol;
polyethertriols;
glycerol;
trimesic acid;
trimellitic acid or anhydride;
pyromellitic acid or dianhydride and
hydroxyisophthalic acid.

When compounds D which have a boiling point below 200° C. are used in the preparation of the polyesters P1, a proportion may distil out of the polycondensation mixture before the reaction. It is therefore preferred to add these compounds in an early stage of the process, such as the transesterification or esterification stage, in order to avoid this complication and in order to achieve the maximum possible uniformity of their distribution within the polycondensate.

In the case of compounds D which boil above 200° C., they can also be employed in a later stage of the process.

By adding the compound D it is possible, for example, to alter the melt viscosity in a desired manner, to increase the impact strength and to reduce the crystallinity of the polymers or molding compositions according to the invention.

The preparation of the biodegradable polyetheresteramides P1 is known in principle (Sorensen and Campbell, Preparative Methods of Polymer Chemistry, Interscience Publishers Inc., New York, 1961, pages 111–127; Encycl. of Polym. Science and Eng., vol. 12, 2nd Ed., John Wiley & Sons, 1988, pages 75–117; Kunststoff-Handbuch, volume 3/1, Carl Hanser Verlag, Munich, 1992, pages 15–23 (preparation of polyesteramides); WO 92/13020; EP-A 568, 593; EP-A 565,235; EP-A 28,687 (preparation of polyesters); Encycl. of Polym. Science and Eng., vol. 12, 2nd Ed., John Wiley & Sons, 1988, pages 1–75, in particular pages 59 and 60; GB 818,157; GB 1,010,916; GB 1,115, 512), so that details on this are superfluous.

Thus, for example, the reaction of dimethyl esters of component (a1) with component (a2) can be carried out at from 160° to 230° C. in the melt under atmospheric pressure, advantageously under an inert gas atmosphere.

In a preferred embodiment, initially the required amino hydroxy compound (a23) is reacted with component (a1), preferably terephthalic acid, dimethyl terephthalate, adipic acid, di-$C_2$–$C_6$-alkyl adipate, succinic anhydride, phthalic anhydride, in a molar ratio of 2:1.

In another preferred embodiment, the required diamine (a24) is reacted with component (a1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In another preferred embodiment, the required bisoxazoline (a25) is reacted with component (a1), preferably terephthalic acid, dimethyl terephthalate, adipic acid, di-$C_2$–$C_6$-alkyl adipate, succinic anhydride, phthalic anhydride, in a molar ratio of at least 0.5:1, preferably 0.5:1.

In the case of a mixture of at least one amino hydroxy compound (a23) and at least one diamino compound (a24) and at least one 2,2'-bisoxazoline (a25), these are expediently reacted in the molar amounts specified in the above-mentioned preferred embodiments with component (a1).

In the preparation of the biodegradable polyetheresteramides P1 it is advantageous to use a molar excess of component (a2) relative to component (a1), for example up to 2½ times, preferably up to 1.67 times.

The biodegradable polyetheresteramide P1 is normally prepared with the addition of suitable conventional catalysts (Encycl. of Polym. Science and Eng., vol. 12, 2nd Ed., John Wiley & Sons, 1988, pages 1–75, in particular pages 59 and 60; GB 818,157; GB 1,010,916; GB 1,115,512) such as metal compounds based on the following elements such as Ti, Ge, Zn, Fe, Mn, Co, Zr, V, Ir, La, Ce, Li and Ca, preferably organometallic compounds based on these metals, such as salts of organic acids, alkoxides, acetylacetonates and the like, particularly preferably based on lithium, zinc, tin and titanium.

When dicarboxylic acids or anhydrides thereof are used as component (a1), esterification thereof with component (a2) can take place before, at the same time as or after the transesterification. For example, the process described in DE-A 23 26 026 for preparing modified polyalkylene terephthalates can be used.

After the reaction of components (a1) and (a2), the polycondensation is carried out as far as the desired molecular weight, as a rule under reduced pressure or in a stream of inert gas, for example of nitrogen, with further heating to from 180° to 260° C.

In order to prevent unwanted degradation and/or side reactions, it is also possible in this stage of the process if required to add stabilizers (see EP-A 21 042 and U.S. Pat. No. 4,321,341). Examples of such stabilizers are the phosphorus compounds described in EP-A 13 461, U.S. Pat. No. 4,328,049 or in B. Fortunato et al., Polymer vol. 35, No. 18, pages 4006–4010, 1994, Butterworth-Heinemann Ltd. These may also in some cases act as inactivators of the catalysts described above. Examples which may be mentioned are: organophosphites, phosphonous acid and phosphorous acid. Examples of compounds which act only as stabilizers are: trialkyl phosphites, triphenyl phosphite, trialkyl phosphates, triphenyl phosphate and tocopherol (obtainable as Uvinul® 2003AO (BASF) for example).

On use of the biodegradable copolymers according to the invention, for example in the packaging sector, eg. for foodstuffs, it is as a rule desirable to select the lowest possible content of catalyst employed and not to employ any toxic compounds. In contrast to other heavy metals such as lead, tin, antimony, cadmium, chromium, etc., titanium and zinc compounds are non-toxic as a rule (Sax Toxic Substance Data Book, Shizuo Fujiyama, Maruzen, K.K., 360 S. (cited in EP-A 565,235), see also Römpp Chemie Lexikon vol. 6, Thieme Verlag, Stuttgart, New York, 9th Edition, 1992, pages 4626–4633 and 5136–5143). Examples which may be mentioned are: dibutoxydiacetoacetoxytitanium, tetrabutyl orthotitanate and zinc(II) acetate.

The ratio by weight of catalyst to biodegradable polyetheresteramides P1 is normally in the range from 0.01:100 to 3:100, preferably from 0.05:100 to 2:100, it also being possible to employ smaller quantities, such as 0.0001:100, in the case of highly active titanium compounds.

The catalyst can be employed right at the start of the reaction, directly shortly before the removal of the excess diol or, if required, also distributed in a plurality of portions during the preparation of the biodegradable polyetheresteramides P1. It is also possible if required to employ different catalysts or mixtures thereof.

The biodegradable polyetheresteramides P2 according to the invention have a molecular weight ($M_n$) in the range from 5000 to 80,000, preferably from 6000 to 45,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polyetheresteramide P2 at 25° C.) and a melting point in the range from 50° to 255°, preferably from 60° to 255° C.

The biodegradable polyetheresteramides P2 are obtained according to the invention by reacting a mixture consisting essentially of (b1) a mixture consisting essentially of 20–95, preferably from 25 to 80, particularly preferably from 30 to 70, mol % of adipic acid or ester-forming derivatives thereof or mixtures thereof, 5–80, preferably from 20 to 75, particularly preferably from 30 to 70, mol % of terephthalic acid or ester-forming derivatives thereof or mixtures thereof, and 0–5, preferably from 0 to 3, particularly preferably from 0.1 to 2, mol % of a compound containing sulfonate groups, where the total of the individual mole percentages is 100 mol %, (b2) mixture (a2), where the molar ratio of (b1) to (b2) is selected in the range from 0.4:1 to 1.25:1, preferably from 0.6:1 to 1.25:1, (b3) from 0.01 to 40, preferably from 0.1 to 30, particularly preferably from 0.5 to 20, % by weight, based on component (b1), of an amino carboxylic acid B1, and (b4) from 0 to 5, preferably from 0 to 4, particularly preferably from 0.01 to 3.5, mol %, based on component (b1), of compound D, where the amino carboxylic acid B1 is selected from the group consisting of natural amino acids, polyamides with a molecular weight not exceeding 18,000 g/mol, preferably not exceeding 15,000 g/mol, and compounds which are defined by the formulae IIIa or IIIb

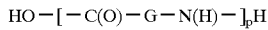    IIIa

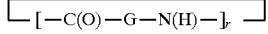    IIIb where p is an integer from 1 to 1500, preferably from 1 to 1000, and r is 1, 2, 3 or 4, preferably 1 and 2, and G is a radical which is selected from the group consisting of phenylene, —$(CH_2)_n$—, where n is an integer from 1 to 12, preferably 1, 5 or 12, —$C(R^2)$H— and —$C(R^2)HCH_2$, where $R^2$ is methyl or ethyl, and polyoxazolines of the general formula IV

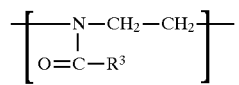    IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl.

The natural amino acids preferably used are the following: glycine, aspartic acid, glutamic acid, alanine, valine, leucine, isoleucine, tryptophan, phenylalanine and oligo- and polymers obtainable therefrom, such as polyaspartimides and polyglutamimides, particularly preferably glycine.

The polyamides normally employed are those obtainable by polycondensation of a dicarboxylic acid with 4 to 6 carbon atoms and a diamine with 4 to 10 carbon atoms such as tetramethylenediamine, pentamethylenediamine, hexamethylenediamine, heptamethylenediamine, octamethylenediamine, nonamethylenediamine and decamethylenediamine.

Preferred polyamides are polyamide-46, polyamide-66 and polyamide-610. These polyamides are generally prepared by conventional methods. It is self-evident that these polyamides may contain conventional additives and auxiliaries and that these polyamides can be prepared with appropriate regulators.

The polyoxazolines IV are, as a rule, prepared by the processes described in DE-A 1,206,585.

Compounds which are defined by the formulae IIIa or IIIb and which should be mentioned as particularly preferred are: 6-aminohexanoic acid, caprolactam, laurolactam and the oligomers and polymers thereof with a molecular weight not exceeding 18,000 g/mol.

The biodegradable polyetheresteramides P2 are expediently prepared in a similar way to the preparation of the polyetheresteramides P1, it being possible to add the amino carboxylic acid B1 both at the start of the reaction and after the esterification or transesterification stage.

The biodegradable polyetheresteramides Q1 according to the invention have a molecular weight ($M_n$) in the range from 5000 to 80,000, preferably from 6000 to 50,000, particularly preferably from 8000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polyetheresteramide Q1 at 25° C.) and a melting point in the range from 50° to 255°, preferably from 60° to 255° C.

The polyetheresteramides Q1 are obtained according to the invention by reacting a mixture consisting essentially of (c1) polyetheresteramide P1, (c2) 0.01–50, preferably from 0.1 to 40, % by weight, based on (c1), of amino carboxylic acid B1, and (c3) 0–5, preferably from 0 to 4, mol %, based on component (a1) from the preparation of P1, of compound D.

The reaction of the polyetheresteramides P1 with the amino carboxylic acid B1, if required in the presence of compound D, preferably takes place in the melt at from 120° to 260° C. under an inert gas atmosphere, if desired also under reduced pressure. The procedure can be both batchwise and continuous, for example in stirred vessels or (reaction) extruders.

The reaction rate can, if required, be increased by adding conventional transesterification catalysts (see those described hereinbefore for the preparation of the polyetheresteramides P1).

When components B1 with higher molecular weights, for example with a p above 10 (ten) are used, it is possible to obtain, by reaction with the polyetheresteramides P1 in stirred vessels or extruders, the desired block structures by the choice of the reaction conditions such as temperature, holdup time, addition of transesterification catalysts such as the abovementioned. Thus, J. of Appl. Polym. Sci., 32 (1986) 6191–6207 and Makromol. Chemie, 136 (1970) 311–313 discloses that in the reaction of polyetheresteramides in the melt it is possible to obtain from a blend by transesterification reactions initially block copolymers and then random copolymers.

The biodegradable polyetheresteramides Q2 according to the invention have a molecular weight ($M_n$) in the range from 6000 to 80,000, preferably from 8000 to 50,000, particularly preferably from 10,000 to 40,000 g/mol, a viscosity number in the range from 30 to 450, preferably from 50 to 400 g/ml (measured in o-dichlorobenzene/phenol (50/50 ratio by weight) at a concentration of 0.5% by weight of polyetheresteramide Q2 at 250° C.), and a melting point in the range from 50° to 200° C., preferably from 60° to 180° C.

The polyetheresteramides Q2 are obtained according to the invention by reacting a mixture consisting essentially of (d1) from 95 to 99.9, preferably from 96 to 99.8, particularly preferably from 97 to 99.65, % by weight of polyether-esteramide P1, (d2) from 0.1 to 5, preferably 0.2–4, particularly preferably from 0.35 to 3, % by weight of a diisocyanate C1 and (d3) from 0 to 5, preferably from 0 to 4, mol %, based on component (a1) from the preparation of P1, of compound D.

It is possible according to observations to date to employ as diisocyanate C1 all conventional and commercially obtainable diisocyanates. A diisocyanate which is selected from the group consisting of tolylene 2,4-diisocyanate, tolylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis(4-isocyanatocyclohexane), particularly preferably hexamethylene diisocyanate, is preferably employed.

It is also possible in principle to employ trifunctional isocyanate compounds which may contain isocyanurate and/or biuret groups with a functionality of not less than three, or to replace the diisocyanate compounds C1 partially by tri- or polyisocyanates.

The polyetheresteramides P1 are reacted with the diisocyanate C1 preferably in the melt, it being necessary to take care that, if possible, no side reactions which may lead to crosslinking or gel formation occur. In a particular embodiment, the reaction is normally carried out at from 130° to 240°, preferably from 140° to 220° C., with the addition of the diisocyanate advantageously taking place in a plurality of portions or continuously.

If required it is also possible to carry out the reaction of the polyetheresteramide P1 with the diisocyanate C1 in the presence of conventional inert solvents such as toluene, methyl ethyl ketone or dimethylformamide (DMF) or mixtures thereof, in which case the reaction is as a rule carried out at from 80° to 200°, preferably from 90° to 150° C.

The reaction with the diisocyanate C1 can be carried out batchwise or continuously, for example in stirred vessels, reaction extruders or through mixing heads.

It is also possible to employ in the reaction of the polyetheresteramides P1 with the diisocyanates C1 conventional catalysts which are disclosed in the prior art (for example those described in EP-A 534 295) or which can be or have been used in the preparation of the polyetheresteramides P1 and Q1 and, if the polyetheresteramides PI have not been isolated in the preparation of polyetheresteramide Q2, can now be used further.

Examples which may be mentioned are: tertiary amines such as triethylamine, dimethylcyclohexylamine, N-methylmorpholine, N,N'-dimethylpiperazine, diazabicyclo[2.2.2]octane and the like and, in particular, organic metal compounds such as titanium compounds, iron compounds, tin compounds, e.g. dibutoxydiacetoacetoxytitanium, tetrabutyl orthotitanate, tin diacetate, dioctoate, dilaurate or the dialkyltin salts of aliphatic carboxylic acids such as dibutyltin diacetate, dibutyltin dilaurate or the like, it again being necessary to take care that, if possible, no toxic compounds ought to be employed.

Although the theoretical optimum for the reaction of P1 with diisocyanates C1 is a 1:1 molar ratio of isocyanate functionality to P1 end group (polyetheresteramides P1 with mainly hydroxyl end groups are preferred), the reaction can also be carried out without technical problems at molar ratios of from 1:3 to 1.5:1. With molar ratios of >1:1 it is possible if desired to add, during the reaction or else after the reaction, a chain extender selected from the components (a2), preferably a $C_2$–$C_6$-diol.

The biodegradable polymers T1 according to the invention have a molecular weight ($M_n$) in the range from 8000 to 80,000, preferably 40 from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polymer T1 at 25° C.) and a melting point in the range from 50° to 255°, preferably from 60° to 255° C.

The biodegradable polymers T1 are obtained according to the invention by reacting a polyetheresteramide Q1 as claimed in claim 3 with (e1) 0.1–5, preferably from 0.2 to 4, particularly preferably from 0.3 to 3, % by weight, based on polyetheresteramide Q1, of diisocyanate C1 and with (e2) 0–5, preferably from 0 to 4, mol %, based on component (a1) from the preparation of P1 and polyetheresteramide Q1, of compound D.

This normally results in a chain extension, with the resulting polymer chains preferably having a block structure.

The reaction is, as a rule, carried out in a similar way to the preparation of the polyetheresteramides Q2.

The biodegradable polymers T2 according to the invention have a molecular weight ($M_n$) in the range from 8000 to 80,000, preferably from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polymer T2 at 25° C.) and a melting point in the range from 50° to 255°, preferably from 60° to 255° C.

The biodegradable polymers T2 are obtained according to the invention by reacting the polyetheresteramide Q2 with (f1) 0.01–50, preferably from 0.1 to 40, % by weight, based on the polyetheresteramide Q2, of the amino carboxylic acid B1 and with (f2) 0–5, preferably from 0 to 4, mol %, based on component (a1) from the preparation of polyetheresteramide Q2 via the polyetheresteramide P1, of compound D, the procedure expediently being similar to the reaction of polyetheresteramide P1 with amino carboxylic acid B1 to give polyetheresteramide Q1.

The biodegradable polymers T3 according to the invention have a molecular weight ($M_n$) in the range from 8000 to 80,000, preferably from 8000 to 50,000, particularly preferably from 10,000 to 40,000, g/mol, a viscosity number in the range from 30 to 450, preferably from 50 to 400, g/ml (measured in o-dichlorobenzene/phenol (50/50 ratio by weight) at a concentration of 0.5% by weight of polymer T3 at 25° C.) and a melting point in the range from 50° to 255°, preferably from 60° to 255° C.

The biodegradable polymers T3 are obtained according to the invention by reacting (g1) polyetheresteramides P2, or (g2) a mixture consisting essentially of polyetheresteramide P1 and 0.01–50, preferably from 0.1 to 40, % by weight, based on the polyetheresteramide P1, of amino carboxylic acid B1, or (g3) a mixture consisting essentially of polyether esteramides P1 which differ from one another in composition, with 0.1–5, preferably from 0.2 to 4, particularly preferably from 0.3 to 2.5, % by weight, based on the amount of the polyetheresteramides used, of diisocyanate C1 and with 0–5, preferably from 0 to 4, mol %, based on the particular molar amounts of component (a1) used to prepare the polyetheresteramides (g1) to (g3) used, of compound D, expediently carrying out the reaction in a similar way to the preparation of the polyetheresteramides Q2 from the polyetheresteramides P1 and the diisocyanates C1.

In a preferred embodiment, polyetheresteramides P2 whose repeating units are randomly distributed in the molecule are employed.

However, it is also possible to employ polyetheresteramides P2 whose polymer chains have block structures. Polyetheresteramides P2 of this type can generally be obtained by appropriate choice, in particular of the molecular weight, of the amino carboxylic acid B1. Thus, according to observations to date there is generally only incomplete transesterification or transamidation when a high molecular weight amino carboxylic acid B1 is used, in particular with a p above 10, for example even in the presence of the inactivators-described above (see J. of Appl. Polym. Sc. 32 (1986), 6191–6207 and Makrom. Chemie, 136 (1970) 311–313).

If required, the reaction can also be carried out in solution using the solvents mentioned for the preparation of the polymers T1 from the polyetheresteramides Q1 and the diisocyanates C1.

The biodegradable thermoplastic molding compositions T4 are obtained according to the invention by mixing in a conventional way, preferably with the addition of conventional additives such as stabilizers, processing aids, fillers, etc. (see J. of Appl. Polym. Sc., 32 (1986) 6191–6207; WO 92/0441; EP 515,203; Kunststoff-Handbuch, vol. 3/1, Carl Hanser Verlag Munich, 1992, pages 24–28)

(h1) 99.5–0.5% by weight of polyetheresteramide P1 as claimed in claim 1 or polyetheresteramide Q2 as claimed in claim 4 with (h2) 0.5–99.5% by weight of hydroxy carboxylic acid H1 of the general formula Va or Vb

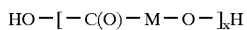  Va

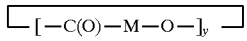  Vb where x is an integer from 1 to 1500, preferably from 1 to 1000, and y is 1, 2, 3 or 4, preferably 1 and 2, and M is a radical selected from the group consisting of phenylene, $-(CH_2)_z-$, where z is an integer of 1, 2, 3, 4 or 5, preferably 1 and 5, $-C(R^2)H-$ and $-C(R^2)HCH_2$, where $R^2$ is methyl or ethyl.

The hydroxy carboxylic acid H1 used in a preferred embodiment is: glycolic acid, D-, L- or D,L-lactic acid, 6-hydroxyhexanoic acid, the cyclic derivatives thereof such as glycolide (1,4-dioxane-2,5-dione), D-, L-dilactide (3,6-dimethyl-1,4-dioxane-2,5-dione), p-hydroxybenzoic acid and the oligomers and polymers thereof, such as poly-3-hydroxybutyric acid, polyhydroxyvaleric acid, polylactide (obtainable as EcoPLA® (from Cargill) for example) and a mixture of poly-3-hydroxybutyric acid and polyhydroxyvaleric acid (the latter is obtainable from Zeneca under the name Biopol®).

In a preferred embodiment, high molecular weight hydroxy carboxylic acids H1 such as polycaprolactone or polylactide or polyglycolide or polyhydroxyalkanoates such as polyhydroxybutyric. acid, with a molecular weight ($M_n$) in the range from 10,000 to 150,000, preferably from 10,000 to 100,000, g/mol are employed.

WO 92/0441 and EP-A 515,203 disclose that high molecular weight polylactide without added plasticizers is too brittle for most applications. It is possible in a preferred embodiment to prepare a blend starting from 0.5–20, preferably from 0.5 to 10, % by weight of polyetheresteramides P1 as claimed in claim 1 or polyetheresteramides Q2 as claimed in claim 4 and 99.5–80, preferably from 99.5 to 90, % by weight of polylactide, which displays a distinct improvement in the mechanical properties, for example an increase in the impact strength, compared with pure polylactide.

Another preferred embodiment relates to a blend obtainable by mixing from 99.5 to 40, preferably from 99.5 to 60, % by weight of polyetheresteramide P1 as claimed in claim 1 or polyetheresteramide Q2 as claimed in claim 4 and from 0.5 to 60, preferably from 0.5 to 40, % by weight of a high molecular weight hydroxy carboxylic acid Hi, particularly preferably polylactide, polyglycolide, poly-3-hydroxybutyric acid and polycaprolactone. Blends of this type are completely biodegradable and, according to observations to date, have very good mechanical properties.

According to observations to date, the thermoplastic molding compositions T4 according to the invention are preferably obtained by observing short mixing times, for example when carrying out the mixing in an extruder. It is also possible to obtain molding compositions which have predominantly blend structures by choice of the mixing parameters, in particular the mixing time and, if required, the use of inactivators, ie. it is possible to control the mixing process so that transesterification reactions can also take place at least partly.

In another preferred embodiment it is possible to replace 0–50, preferably 0–30, mol % of the adipic acid or the ester-forming derivatives thereof or the mixtures thereof by at least one other aliphatic $C_4$–$C_{10}$- or cycloaliphatic $C_5$–$C_{10}$-dicarboxylic acid or dimer fatty acids such as succinic acid, glutaric acid, pimelic acid, suberic acid, azelaic acid or sebacic acid or an ester derivative such as the di-$C_1$–$C_6$-alkyl esters thereof or the anhydrides thereof such as succinic anhydride, or mixtures thereof, preferably succinic acid, succinic anhydride, sebacic acid, dimer fatty acid and di-$C_1$–$C_6$-alkyl esters such as dimethyl, diethyl, di-n-propyl, diisobutyl, di-n-pentyl, dineopentyl, di-n-hexyl esters thereof, especially dimethyl succinate.

A particularly preferred embodiment relates to the use as component (a1) of the mixture, described in EP-A 7445, of succinic acid, adipic acid and glutaric acid and the $C_1$–$C_6$-alkyl esters thereof such as dimethyl, diethyl, di-n-propyl, diisobutyl, di-n-pentyl, dineopentyl, di-n-hexyl esters, especially the dimethyl esters thereof.

In another preferred embodiment it is possible to replace 0–50, preferably 0–40, mol % of the terephthalic acid or the ester-forming derivatives thereof, or the mixtures thereof, by at least one other aromatic dicarboxylic acid such as isophthalic acid, phthalic acid or 2,6-naphthalenedicarboxylic acid, preferably isophthalic acid, or an ester derivative such as a di-$C_1$–$C_6$-alkyl ester such as dimethyl, diethyl, di-n-propyl, diisobutyl, di-n-pentyl, dineopentyl, di-n-hexyl ester, in particular a dimethyl ester, or mixtures thereof.

It should be noted in general that the various polymers according to the invention can be worked up in a conventional way by isolating the polymers or, in particular if it is wished to react the polyetheresteramides P1, P2, Q1 and Q2 further, by not isolating the polymers but immediately processing them further. The polymers according to the invention can be applied to coating substrates by rolling, spreading, spraying or pouring. Preferred coating substrates are those which are compostable or rot such as moldings of paper, cellulose or starch.

The polymers according to the invention can also be used to produce moldings which are compostable. Moldings which may be mentioned by way of example are: disposable articles such as crockery, cutlery, refuse sacks, sheets for agriculture to advance harvesting, packaging sheets and vessels for growing plants.

It is furthermore possible to spin the polymers according to the invention into threads in a conventional way. The threads can, if required, be stretched, stretch-twisted, stretch-wound, stretch-warped, stretch-sized and stretch-texturized by customary methods. The stretching to flat yarn can moreover take place in the same working step (fully drawn yarn or fully oriented yarn) or in a separate step. The stretch warping, stretch sizing and stretch texturizing are generally carried out in a working step separate from the spinning. The threads can be further processed to fibers in a conventional way. Sheet-like structures can then be obtained from the fibers by weaving or knitting.

The moldings, coating compositions and threads etc. described above can, if required, also contain fillers which can be incorporated during the polymerization process at any stage or subsequently, for example in a melt of the polymers according to the invention.

It is possible to add from 0 to 80% by weight of fillers, based on the polymers according to the invention. Examples of suitable fillers are carbon black, starch, lignin powder, cellulose fibers, natural fibers such as sisal and hemp, iron oxides, clay minerals, ores, calcium carbonate, calcium sulfate, barium sulfate and titanium dioxide. The fillers can in some cases also contain stabilizers such as tocopherol (vitamin E), organic phosphorus compounds, mono-, di- and polyphenols, hydroquinones, diarylamines, thioethers, UV stabilizers, nucleating agents such as talc, and lubricants and mold release agents based on hydrocarbons, fatty alcohols, higher carboxylic acids, metal salts of higher carboxylic acids such as calcium and zinc stearate, and montan waxes. Such stabilizers etc. are described in detail in Kunststoff-Handbuch, vol. 3/1, Carl Hanser Verlag, Munich, 1992, pages 24–28.

The polymers according to the invention can additionally be colored in any desired way by adding organic or inorganic dyes. The dyes can also in the widest sense be regarded as filler.

A particular application of the polymers according to the invention relates to the use as compostable sheet or a compostable coating as outer layer of diapers. The outer layer of the diapers effectively prevents penetration by liquids which are absorbed inside the diaper by the fluff and superabsorbers, preferably by biodegradable superabsorbers, for example based on crosslinked polyacrylic acid or crosslinked polyacrylamide. It is possible to use a web of a cellulose material as inner layer of the diaper. The outer layer of the described diapers is biodegradable and thus compostable. It disintegrates on composting so that the entire diaper rots, whereas diapers provided with an-outer layer of, for example, polyethylene cannot be composted without previous reduction in size or elaborate removal of the polyethylene sheet.

Another preferred use of the polymers and molding compositions according to the invention relates to the production of adhesives in a conventional way (see, for example, Encycl. of Polym. Sc. and Eng. vol.1, "Adhesive Compositions", pages 547–577). The polymers and molding compositions according to the invention can also be processed as disclosed in EP-A 21042 using suitable tackifying thermoplastic resins, preferably natural resins, by the methods described therein.

Another preferred application relates to the production of completely degradable blends with starch mixtures (preferably with thermoplastic starch as described in WO 90/05161) in a similar process to that described in DE-A 42 37 535. The polymers and thermoplastic molding compositions according to the invention can, according to observations to date, because of their hydrophobic nature, their mechanical properties, their complete biodegradability, their good compatibility with thermoplastic starch and not least because of their favorable raw material basis, advantageously be employed as synthetic blend component.

Further applications relate, for example, to the use of the polymers according to the invention in agricultural mulch, packaging material for seeds and nutrients, substrate in adhesive sheets, baby pants, pouches, bed sheets, bottles, boxes, dust bags, labels, cushion coverings, protective clothing, hygiene articles, handkerchiefs, toys and wipes.

Another use of the polymers and molding compositions according to the invention relates to the production of foams, generally by conventional methods (see EP-A 372,846; Handbook of Polymeric foams and Foam Technology, Hanser Publisher, Munich, 1991, pages 375–408). This normally entails the polymer or molding composition according to the invention being initially melted, if required with the addition of up to 5% by weight of compound D, preferably pyromellitic dianhydride and trimellitic anhydride, then a blowing agent being added and the resulting mixture being exposed to reduced pressure by extrusion, resulting in foaming.

The advantages of the polymers according to the invention over known biodegradable polymers are a favorable raw material basis with readily available starting materials such as adipic acid, terephthalic acid and conventional diols, interesting mechanical properties due to the combination of "hard" (owing to the aromatic dicarboxylic acids such as terephthalic acid) and "soft" (owing to the aliphatic dicarboxylic acids such as adipic acid) segments in the polymer chain and the variation in uses due to simple modifications, a satisfactory degradation by microorganisms, especially in compost and soil, and a certain resistance to microorganisms in aqueous systems at room temperature, which is particularly advantageous for many applications. The random incorporation of the aromatic dicarboxylic acids of component (a1) in various polymers makes biological attack possible and thus achieves the desired biodegradability.

A particular advantage of the polymers according to the invention is that it is possible by tailoring the formulations to optimize both the biodegradation and the mechanical properties for the particular application.

It is furthermore possible depending on the preparation process advantageously to obtain polymers with predominantly random distribution of monomer units, polymers with predominantly block structures and polymers with predominantly blend structure or blends.

EXAMPLES

Abbreviations

TTB: Titanium tetrabutoxide

DMT: Dimethyl terephthalate

Preparation of a polyesteramide P1$_a$

Precursor 1$_a$ 4.672 kg of 1,4-butanediol, 7.000 kg of adipic acid and 50 g of tin dioctoate were heated under inert gas (nitrogen) to 230°–240° C. After most of the water formed in the reaction had distilled out, 10 g of TTB were added. As soon as the acid number AN had fallen below 1, the excess butanediol was distilled out under reduced pressure until the OH number reached about 56.

P1$_a$ 58.5 g of DMT were heated with 36.5 g of ethanolamine in a vessel while stirring slowly under a nitrogen atmosphere to 180° C. After 30 min, 360 g of the precursor, 175 g of DMT, 1.3 g of pyromellitic dianhydride, 300 g of 1,4-butanediol, 63.5 g of diethylene glycol and 1 g of TTB were added under a nitrogen atmosphere. The methanol and water formed during the transesterification were removed by distillation. The mixture was heated to 230° C. over the course of 3 h while increasing the stirring speed and, after 2 h, 0.4 g of 50% strength aqueous phosphorous acid was added. Over the course of 2 h, the pressure was reduced to 5 mbar and was then kept below 2 mbar and at 240° C. for 1 h, during which the excess 1,4-butanediol distilled out. An elastic, pale brown product was obtained.

OH number: 6 mg KOH/g

AN: below 1 mg KOH/g prim. amine: below 0.1 g/100 g.

DSC measurements revealed two melting points at 65° and 83° C. and a glass transition temperature of −33° C. for P1$_a$.

Preparation of a polyesteramide Q1$_a$ 384 g of 1,4-butanediol, 6.1 g of ethanolamine, 316 g of DMT and 1 g of TTB were heated while stirring slowly under a nitrogen atmosphere to 180° C. The methanol formed in the transesterification was distilled out. After adding 101.6 g of adipic acid and 278 g of polyethylene glycol with a molecular weight of 600 g/mol, the mixture was heated under a nitrogen atmosphere while increasing the stirring speed to 230° C. over the course of 2 h, and the water formed in the condensation was distilled out. Then 62.5 g of a non-extracted, monomer-containing polyamide with a viscosity number of 85 and about 10.5% by weight of residual extract (eg. Ultramid® B15 from BASF) were added under a nitrogen atmosphere. After 2 h, 0.4 g of 50% strength aqueous phosphorous acid was added, the pressure was reduced stepwise to 5 mbar and then kept below 2 mbar and at 230° C. for 1 h, during which the water formed in the condensation and the excess 1,4-butanediol distilled out.

OH number: 5 mg KOH/g

AN: below 1 mg KOH/g.

DSC measurements revealed two melting points at 126° and 216° C. and a glass transition temperature at −44° C.

Preparation of a Biodegradable Polymer T1$_a$ 250 g of precursor 1a, 560 g of DMT, 560 g of 1,4-butanediol, 12.2 g of ethanolamine, 622 kg of a polyethylene glycol with a molecular weight of 600 g/mol and 1 g of TTB were heated while stirring slowly to 180° C. The methanol formed in the transesterification was distilled out. The mixture was heated to 230° C. while increasing the stirring speed over the course of 3 h, and 75 g of an extracted and dried polyamide with a viscosity number of 85 and less than 0.4% by weight of residual extract (eg. Ultramid® B15 from BASF), 2.6 g of pyromellitic dianhydride and, after 2 hours, 0.8 g of 50% strength aqueous phosphorous acid were added. The pressure was reduced to 5 mbar over the course of 2 h and then kept below 2 mbar and at 240° C. for 45 min, during which the excess 1,4-butanediol distilled out.

OH number: 13 mg KOH/g

Acid number: 1.5 mg KOH/g

DSC measurements revealed two melting points at 113° and 216° C. and a glass transition temperature of less than −42° C.

300 g of this product were cooled to 180° C., and 5.5 g of hexamethylene diisocyanate were added in 3 portions over the course of 30 min. The increase in molecular weight was detectable from the distinct increase in the melt viscosity.

OH number: 4 mg KOH/g

Acid number: 1.5 mg KOH/g.

Enzyme assay with *Rhizopus arrhizus*: ΔDOC: 87 mg/l/ΔDOC (PCL): 2455.

Methods of Measurement

Enzyme assay

The polymers were cooled with liquid nitrogen or dry ice in a mill and finely ground (the rate of enzymatic breakdown increases with the surface area of the milled material). The enzyme assay was carried out by placing 30 mg of finely ground polymer powder and 2 ml of a 20 mmol/l aqueous K$_2$HPO$_4$/KH$_2$PO$_4$ buffer solution (pH: 7.0) in an Eppendorf tube (2 ml) and equilibrated on a rotator at 37° C. for 3 h. Subsequently 100 units of lipase from either *Rhizopus arrhizus, Rhizopus delemar* or Pseudomonas pl. were added and incubated on the rotator (250 rpm) at 37° C. for 16 h. The reaction mixture was then filtered through a Millipore® membrane (0.45 μm), and the DOC (dissolved organic carbon) of the filtrate was measured. Similar DOC measurements were carried out in one case only with buffer and enzyme (as enzyme control) and in one case only with buffer and sample (as blank).

The ΔDOC values found (DOC (sample+enzyme)−DOC (enzyme control)−DOC (blank value)) can be regarded as a measure of the enzymatic degradability of the samples. They are presented in each case comparing with a measurement with powder from polycaprolactone® Tone P 787 (Union Carbide). It must be remembered in the assessment that these are not absolutely quantifiable data. The connection between the surface area of the milled material and the speed of enzymatic breakdown has been referred to above. Furthermore the enzyme activities may also vary.

The hydroxyl number (OH number) and acid number (AN) were determined by the following methods:

(a) Determination of the apparent hydroxyl number 10 ml of toluene and 9.8 ml of acetylating reagent (see below) were added to about 1 to 2 g of accurately weighed test substance and heated at 95° C. with stirring for 1 h. Then 5 ml of distilled water were added. After cooling to room temperature, 50 ml of tetrahydrofuran (THF) were added, and potentiographic titration to the turning point was carried out with standard ethanolic KOH solution.

The experiment was repeated without test substance (blank sample).

The apparent OH number was then found from the following formula:

apparent OH number $c \times t \times 56.1(V2 - V1)/m$ (in mg KOH/g)

where $c$ = amount of substance concentration of the standard ethanolic KOH solution in mol/l $t$ = titer of the standard ethanolic KOH solution $m$ = weight of test substance in mg $V1$ = ml of standard solution used with test substance $V2$ = ml of standard solution used without test substance.

Reagents Used standard ethanolic KOH solution, c=0.5 mol/l, titer 0.9933 (Merck, Cat. No. 1.09114)

acetic anhydride, analytical grade (Merck, Cat. No. 42)
pyridine, analytical grade (Riedel de Haen, Cat. No. 33638)
acetic acid, analytical grade (Merck, Cat. No. 1.00063)
acetylating reagent: 810 ml of pyridine, 100 ml of acetic anhydride and 9 ml of acetic acid
water, deionized
THF and toluene (b) Determination of the acid number (AN)

About 1 to 1.5 g of test substance were weighed accurately, 10 ml of toluene and 10 ml of pyridine were added, and the mixture was then heated to 95° C. After dissolving, the solution was cooled to room temperature, 5 ml of water and 50 ml of THF were added, and titration was carried out with 0.1N standard ethanolic KOH solution.

The determination was repeated without test substance (blank sample).

The acid number was then found from the following formula:

---

AN = c × t × 56.1(V1 − V2)/m (in mg KOH/g)
where c = amount of substance concentration of the standard ethanolic KOH solution in mol/l
t = titer of the standard ethanolic KOH solution
m = weight of test substance in mg
V1 = ml of standard solution used with test substance
V2 = ml of standard solution used without test substance.

---

Reagents Used
standard ethanolic KOH solution, c=0.1 mol/l, titer= 0.9913 (Merck, Cat. No. 9115)
pyridine, analytical grade (Riedel de Haen, Cat. No. 33638)
water, deionized
THF and toluene c) Determination of the OH Number The OH number is obtained from the sum of the apparent OH number and the AN:

OH number=apparent OH number+AN

The viscosity number (VN) was measured in o-dichlorobenzene/phenol (50/50 ratio by weight) at a concentration of 0.5% by eight of polymer at 25° C.

The DSC measurements were carried out with a DuPont DSC 912 apparatus+thermal analyzer 990. The temperature and enthalpy calibration took place in a conventional way. The weight of sample was typically 13 mg. The heating and cooling rates were 20 K/min. The samples were measured under the following conditions: 1. Heating run on samples in the state supplied, 2. Rapid cooling from the melt, 3. Heating run on the samples cooled from the melt (samples from 2). The second DSC runs in each case were used to compare various samples after a uniform thermal history.

We claim:

1. A biodegradable polyetheresteramide P1 obtained by reacting a mixture consisting essentially of
   (a1) a mixture consisting essentially of 20–95 mol % of adipic acid or ester-forming derivatives thereof or mixtures thereof,
   5–80 mol % of terephthalic acid or ester-forming derivatives thereof or mixtures thereof, and
   0–5 mol % of a compound containing sulfonate groups, where the total of the individual mole percentages is 100 mol %, and
   (a2) a mixture of dihydroxy compounds consisting essentially of
   (a21) from 15 to 99.3 mol % of a dihydroxy compound selected from the group consisting of $C_2$–$C_6$-alkanediols and $C_5$–$C_{10}$-cycloalkanediols,
   (a22) from 0.2 to 85 mol % of a dihydroxy compound containing ether functionalities of the formula I $$HO\text{-}[(CH_2)_n\text{—}O]_m\text{—}H \qquad I$$

where n is 2, 3 or 4 and m is an integer from 2 to 250, or mixtures thereof,
   (a23) from 0.5 to 80 mol % of an amino-$C_2$–$C_{12}$-alkanol or amino-$C_5$–$C_{10}$-cycloalkanol, and
   (a24) from 0 to 50 mol % of a diamino-$C_1$–$C_8$-alkane,
   (a25) from 0 to 50 mol % of a 2,2'-bisoxazoline of the formula II

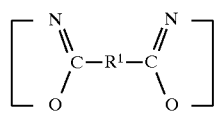

where $R^1$ is a single bond, a $(CH_2)_q$ alkylene group with q=2, 3 or 4, or a phenylene group, where the total of the individual mole percentages is 100 mol %,
where the molar ratio of (a1) to (a2) is selected in the range from 0.4:1 to 1.5:1,
with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1.

2. A biodegradable polyetheresteramide Q1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide Q1 at 25° C.) and a melting point in the range from 50° to 255° C., obtained by reacting a mixture consisting essentially of
   (c1) polyetheresteramide P1 as defined in claim 1,
   (c2) 0.01–50% by weight, based on (c1), of amino carboxylic acid B1,
   where the amino carboxylic acid B1 is selected from the group consisting of the natural amino acids, polyamides with a molecular weight not exceeding 18,000 g/mol, obtainable by polycondensation of a dicarboxylic acid with 4 to 6 carbon atoms and a diamine with 4 to 10 carbon atoms and compounds which are defined by the formulae IIIa and IIIb

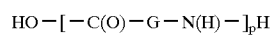

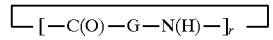

where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with the repeating unit IV

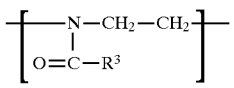

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and (c3) 0–5 mol %, based on the molar amount of component (a1) used for the preparation of P1, of compound D with at least three groups capable of ester formation.

3. A biodegradable polyetheresteramide Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., obtained by reacting a mixture consisting essentially of (d1) from 95 to 99.9% by weight of polyetheresteramide P1 as defined in claim 1, (d2) from 0.1 to 5% by weight of a diisocyanate C1 and (d3) from 0 to 5 mol %, based on the molar amount of component (a1) used for the preparation of P1, of compound D with at least three groups capable of ester formation.

4. A biodegradable polymer T1 with a molecular weight ($M_n$) in the range from 8000 to 80,000 g/mol, with a viscosity number in the range from 30 to 450 g/ml (measured in o-chlorobenzene/phenol (50/50 ratio by weight) at a concentration of 0.5% by weight of polymer T1 at 25° C.) and a melting point in the range from 50° to 255° C., obtainable by reacting the polyetheresteramide Q1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide Q1 at 25° C.) and a melting point in the range from 50° to 255° C., obtainable by reacting a mixture consisting essentially of (c1) polyetheresteramide P1 as defined in claim 1, (c2) 0.01–50% by weight, based on (c1), of amino carboxylic acid B1, where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb $$HO-[-C(O)-G-N(H)-]_pH \quad \text{IIIa}$$

where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with the repeating unit IV

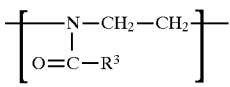

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and (c3) 0–5 mol %, based on the molar amount of component (a1) used for the preparation of P1, of compound D with at least three groups capable of ester formation with (e') 0.1–5% by weight, based on the polyetheresteramide Q1, of diisocyanate C1 and with (e2) 0–5 mol %, based on the molar amount of component (a1) used for the preparation of polyetheresteramide Q1, of compound D.

5. A biodegradable polymer T2 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight of polymer T2 at 25° C.) and a melting point in the range from 50° to 255° C., obtainable by reacting the polyetheresteramide Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., obtained by reacting a mixture consisting essentially of (d1) from 95 to 99.9% by weight of polyetheresteramide P1 as defined in claim 1, (d2) from 0.1 to 5% by weight of a diisocyanate C1 and (d3) from 0 to 5 mol %, based on the molar amount of component (a1) used for the preparation of P1, of compound D with at least three groups capable of ester formation with (f1) 0.01–50% by weight, based on polyetheresteramide Q2, of amino carboxylic acid B1 where the amino carboxylic acid B1 is selected from the group consisting of the natural amino acids, polyamides with a molecular weight not exceeding 18,000 g/mol, obtainable by polycondensation of a dicarboxylic acid with 4 to 6 carbon atoms and a diamine with 4 to 10 carbon atoms and compounds are defined by formulae IIIa and IIIb $$HO-[-C(O)-G-N(H)-]_pH \quad \text{IIIa}$$

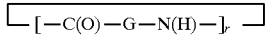

where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with the repeating unit IV

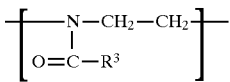

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and with (f2) 0–5 mol %, based on the molar amount of component (a1) used for the preparation of polyetheresteramide Q2, of compound D.

6. A biodegradable thermoplastic molding composition T4 obtained by mixing in a conventional way
(h1) 99.5–0.5% by weight of polyetheresteramide P1 as defined in claim 1 or polyetheresteramide Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., obtained by reacting a mixture consisting essentially of
(d1) from 95 to 99.9% by weight of polyetheresteramide P1 as defined in claim 1,
(d2) from 0.1 to 5% by weight of a diisocyanate C1 and
(d3) from 0 to 5 mol %, based on the molar amount of component (a1) used for the preparation of P1, of compound D with at least three groups capable of ester formation with
(h2) 0.5–99.5% by weight of a hydroxy carboxylic acid H1 of the formula Va or Vb $$HO-[-C(O)-M-O-]_xH \qquad Va$$

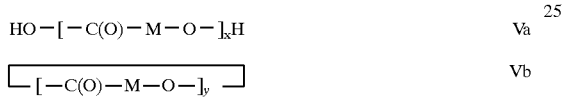   Vb where x is an integer from 1 to 1500, preferably from 1 to 1000, and y is 1, 2, 3 or 4, preferably 1 and 2, and M is a radical selected from the group consisting of phenylene, —$(CH_2)_z$—, where z is an integer of 1, 2, 3, 4 or 5, preferably 1 and 5, —$C(R^2)H$— and —$C(R^2)HCH_2$, where $R^2$ is methyl or ethyl.

7. A compostable molding obtained from polyetheresteramides P1 as defined in claim 1.

8. An adhesive obtained from polyetheresteramides P1 as defined in claim 1.

9. A biodegradable blend obtained from polyetheresteramides P1 as defined in claim 1.

10. A biodegradable foam obtained from polyetheresteramides P1 as defined in claim 1.

11. A paper coating composition obtained from polyetheresteramides P1 as defined in claim 1.

12. A biodegradable polyetheresteramide P2 obtained by reacting a mixture consisting essentially of
(b1) a mixture consisting essentially of
20–95 mol % of adipic acid or ester-forming derivatives thereof or mixtures thereof,
5–80 mol % of terephthalic acid or ester-forming derivatives thereof or mixtures thereof, and
0–5 mol % of a compound containing sulfonate groups, where the total of the individual mole percentages is 100 mol %,
(b2) mixture (a2), of dihydroxy compounds, consisting essentially of
(a21) from 15 to 99.3 mol % of a dihydroxy compound selected from the group consisting of $C_2$–$C_6$-alkanediols and $C_5$–$C_{10}$-cycloalkanediols,
(a22) from 0.2 to 85 mol % of a dihydroxy compound containing ether functionalities of the formula I $$HO-[(CH_2)_n-O]_m-H \qquad I$$

where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and
(a24) from 0 to 50 mol % of a diamino-$C_1$–$C_8$-alkane,
(a25) from 0 to 50 mol % of a 2,2'-bisoxazoline of the formula II

where $R^1$ is a single bond, a $(CH_2)_q$ alkylene group with q=2, 3 or 4, or a phenylene group, where the total of the individual mole percentages is 100 mol %,
where the molar ratio of (b1) to (b2) is selected in the range from 0.4:1 to 1.25:1,
(b3) from 0.01 to 40% by weight, based on component (b1), of an amino carboxylic acid B1, and
(b4) from 0 to 5 mol %, based on component (b1), of compound D with at least three groups capable of ester formation,
where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb $$HO-[-C(O)-G-N(H)-]_pH \qquad IIIa$$

   IIIb where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl,
and polyoxazolines with the repeating unit IV

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl,
where the polyesteramide P2 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P2 at 25° C.) and a melting point in the range from 50° to 255° C.

13. A biodegradable polymer T3 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight of polymer T3 at 25° C.) and a melting point in the range from 50° to 255° C., obtained by reacting
(g1) polyetheresteramide P2 obtained by reacting a mixture consisting essentially of
(b1) a mixture consisting essentially of
20–95 mol % of adipic acid or ester-forming derivatives thereof or mixtures thereof,
5–80 mol % of terephthalic acid or ester-forming derivatives thereof or mixtures thereof, and 0–5 mol % of a compound containing sulfonate groups, where the total of the individual mole percentages is 100 mol %, (b2) mixture (a2), of dihydroxy compounds, consisting esentially of (a21) from 15 to 99.3 mol % of a dihydroxy compound selected from the group consisting of $C_2$–$C_6$-alkanediols and $C_5$–$C_{10}$-cycloalkanediols, (a22) from 0.2 to 85 mol % of a dihydroxy compound containing ether functionalities of the formula I

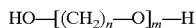

where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and (a24) from 0 to 50 mol % of a diamino-$C_1$–$C_8$-alkane, (a25) from 0 to 50 mol % of a 2,2'-bisoxazoline of the formula II

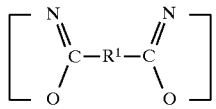

where R1 is a single bond, a $(CH_2)_q$ alkylene group with q=2, 3 or 4, or a phenylene group, where the total of the individual mole percentages is 100 mol %, where the molar ratio of (b1) to (b2) is selected in the range from 0.4:1 to 1.25:1, (b3) from 0.01 to 40% by weight, based on component (b1), of an amino carboxylic acid B1, and (b4) from 0 to 5 mol %, based on component (b1), of compound D with at least three groups capable of ester formation, where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

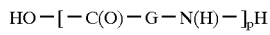
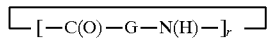

where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$, where $R^2$ is methyl or ethyl, and polyoxazolines with the repeating unit IV

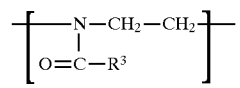

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, where the polyesteramide P2 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P2 at 25° C.) and a melting point in the range from 50° to 255° C. or (g2) a mixture consisting essentially of polyetheresteramide P1 as claimed in claim 1 and 0.01–50% by weight, based on polyetheresteramide P1, of amino carboxylic acid B1, (g3) a mixture consisting essentially of polyetheresteramides P1 which differ from one another in composition, with 0.1–5% by weight, based on the amount of the polyetheresteramides used, of diisocyanate C1 and with 0–5 mol %, based on the particular molar amounts of component (a1) used to prepare-the polyetheresteramides (g1) to (g3) used, of compound D.

14. A process for preparing the biodegradable polyetheresteramides P1 having a molecular weight ($M_n$) in the range from 5000 to 80,000-g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., which comprises reacting a mixture consisting essentially of (a1) a mixture consisting essentially of
20–95 mol % of adipic acid or ester-forming derivatives thereof or mixtures thereof,
5–80 mol % of terephthalic acid or ester-forming derivatives thereof or mixtures thereof, and
0–5 mol % of a compound containing sulfonate groups, where the total of the individual mole percentages is 100 mol %, and (a2) a mixture of dihydroxy compounds consisting essentially of
(a21) from 15 to 99.3 mol % of a dihydroxy compound selected from the group consisting of $C_2$–$C_6$-alkanediols and $C_5$–$C_{10}$-cycloalkanediols,
(a22) from 0.2 to 85 mol % of a dihydroxy compound containing ether functionalities of the formula I

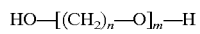

where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and
(a24) from 0 to 50 mol % of a diamino-$C_1$–$C_8$-alkane,
(a25) from 0 to 50 mol % of a 2,2'-bisoxazoline of the formula II

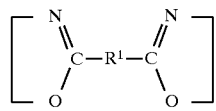

where $R^1$ is a single bond, a $(CH_3)_q$ alkylene group with q=2, 3 or 4, or a phenylene group, where the total of the individual mole percentages is 100 mol %, where the molar ratio of (a1) to (a2) is selected in the range from 0.4:1 to 1.5:1, and from 0 to 5 mol %, based on the molar amount of component (a1) used, of a compound D which has at least three groups capable of ester formation.

15. A process for preparing the biodegradable polyetheresteramides P2 having a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P2 at 25° C.) and a melting point in the range from 50° to 255° C., which comprises reacting a mixture consisting essentially of
- (b1) a mixture consisting essentially of
  - 20–95 mol % of adipic acid or ester-forming derivatives thereof or mixtures thereof,
  - 5–80 mol % of terephthalic acid or ester-forming derivatives thereof or mixtures thereof, and
  - 0–5 mol % of a compound containing sulfonate groups, where the total of the individual mole percentages is 100 mol %,
- (b2) mixture (a2), of dihydroxy compounds, consisting essentially of
  - (a21) from 15 to 99.3 mol % of a dihydroxy compound selected from the group consisting of $C_2$–$C_6$-alkanediols and $C_5$–$C_{10}$-cycloalkanediols,
  - (a22) from 0.2 to 85 mol % of a dihydroxy compound containing ether functionalities of the formula I

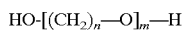

HO-[(CH$_2$)$_n$—O]$_m$—H  I where n is 2, 3 or 4 and m is an integer from 2 to 250, or mixtures thereof,
  - (a23) from 0.5 to 80 mol % of an amino-$C_2$–$C_{12}$-alkanol or amino-$C_5$–$C_{10}$-cycloalkanol, and
  - (a24) from 0 to 50 mol % of a diamino-$C_1$–$C_8$-alkane,
  - (a25) from 0 to 50 mol % of a 2,2'-bisoxazoline of the formula II

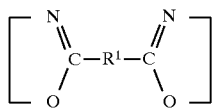

where $R^1$ is a single bond, a (CH$_2$)$_q$ alkylene group with q=2, 3 or 4, or a phenylene group, where the total of the individual mole percentages is 100 mol %,
where the molar ratio of (b1) to (b2) is selected in the range from 0.4:1 to 1.5:1,
- (b3) from 0.01 to 40% by weight, based on component (b1), of an amino carboxylic acid B1,
where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

HO—[—C(O)—G—N(H)—]$_p$H  IIIa

[—C(O)—G—N(H)—]$_r$  IIIb where p is an integer from 1 to 1500 and r is an integer from 1 to 4, and G is a radical which is selected from the group consisting of phenylene, —(CH$_2$)$_n$—, where n is an integer from 1 to 12, —C(R$^2$)H— and —C(R$^2$)HCH$_2$, where $R^2$ is methyl or ethyl, and polyoxazolines with the repeating unit IV

where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and
- (b4) from 0 to 5 mol %, based on component (b1), of compound D with at least three groups capable of ester formation.

16. A process for preparing the biodegradable polyetheresteramides Q1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide Q1 at 25° C.) and a melting point in the range from 50° to 255° C., which comprises in a first step preparing
- (c1) polyetheresteramide P1 obtained by reacting a mixture consisting essentially of
- (a1) a mixture consisting essentially of 20–95 mol % of adipic acid or ester-forming derivatives thereof or mixtures thereof,
  - 5–80 mol % of terephthalic acid or ester-forming derivatives thereof or mixtures thereof, and
  - 0–5 mol % of a compound containing sulfonate groups, where the total of the individual mole percentages is 100 mol %, and
- (a2) a mixture of dihydroxy compounds consisting essentially of
  - (a21) from 15 to 99.3 mol % of a dihydroxy compound selected from the group consisting of $C_2$–$C_6$-alkanediols and $C_5$–$C_{10}$-cycloalkanediols,
  - (a22) from 0.2 to 85 mol % of a dihydroxy compound containing ether functionalities of the formula I

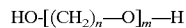

HO-[(CH$_2$)$_n$—O]$_m$—H  I where n is 2, 3 or 4 and m is an integer from 2 to 250, or mixtures thereof,
  - (a23) from 0.5 to 80 mol % of an amino-$C_2$–$C_{12}$-alkanol or amino-$C_5$–$C_{10}$-cycloalkanol, and
  - (a24) from 0 to 50 mol % of a diamino-$C_1$–C8-alkane,
  - (a25) from 0 to 50 mol % of a 2,2'-bisoxazoline of the formula II

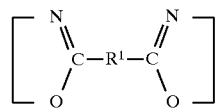

where $R^1$ is a single bond, a (CH$_2$)$_q$ alkylene group with q=2, 3 or 4, or a phenylene group, where the total of the individual mole percentages is 100 mol %,
where the molar ratio of (a1) to (a2) is selected in the range from 0.4:1 to 1.5:1,
with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1,
and in a second step reacting P1 with
- (c2) 0.01–50% by weight, based on (c1), of amino carboxylic acid B1, where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

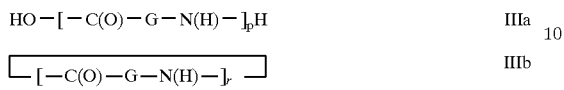   IIIa

   IIIb where p is an integer from 1 to 1500 and r is an integer from 1 to 4, and G is a radical which is selected from the group consisting of phenylene, $-(CH_2)_n-$, where n is an integer from 1 to 12, $-C(R^2)H-$ and $-C(R^2)HCH_2$, where $R^2$ is methyl or ethyl, and polyoxazolines with the repeating unit IV

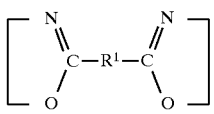   IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and (c3) 0–5 mol %, based on the molar amount of component (a1) used for the preparation of P1, of compound D.

17. A process for preparing the biodegradable polyetheresteramides Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., which comprises in a first step preparing (d1) polyetheresteramide P1 obtained by reacting a mixture consisting essentially of (a1) a mixture consisting essentially of 20–95 mol % of adipic acid or ester-forming derivatives thereof or mixtures thereof, 5–80 mol % of terephthalic acid or ester-forming derivatives thereof or mixtures thereof, and 0–5 mol % of a compound containing sulfonate groups, where the total of the individual mole percentages is 100 mol %, and (a2) a mixture of dihydroxy compounds consisting essentially of (a21) from 15 to 99.3 mol % of a dihydroxy compound selected from the group consisting of $C_2$–$C_6$-alkanediols and $C_5$–$C_{10}$-cycloalkanediols, (a22) from 0.2 to 85 mol % of a dihydroxy compound containing ether functionalities of the formula I $$HO-[(CH_2)_n-O]_m-H \qquad I$$

where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and (a24) from 0 to 50 mol % of a diamino-$C_1$–$C_8$-alkane, (a25) from 0 to 50 mol % of a 2,2'-bisoxazoline of the formula II

   II where $R^1$ is a single bond, a $(CH_2)_q$ alkylene group with q=2, 3 or 4, or a phenylene group, where the total of the individual mole percentages is 100 mol %, where the molar ratio of (a1) to (a2) is selected in the range from 0.4:1 to 1.5:1, with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1, and in a second step reacting a mixture consisting essentially of from 95 to 99.9% by weight of (d1), (d2) from 0.1 to 5% by weight of a diisocyanate C1 and (d3) from 0 to 5 mol %, based on the molar amount of component (a1) used for the preparation of P1, of compound D.

18. A process for preparing the biodegradable polymers T1 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight of polymer T1 at 25° C.) and a melting point in the range from 50° to 255° C., which comprises in a first step reacting polyetheresteramide Q1 with a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide Q1 at 25° C.) and a melting point in the range from 50° to 255° C., obtained by reacting a mixture consisting essentially of (c1) polyetheresteramide P1 obtainable by reacting a mixture consisting essentially of (a1) a mixture consisting essentially of 20–95 mol % of adipic acid or ester-forming derivatives thereof or mixtures thereof, 5–80 mol % of terephthalic acid or ester-forming derivatives thereof or mixtures thereof, and 0–5 mol % of a compound containing sulfonate groups, where the total of the individual mole percentages is 100 mol %, and (a2) a mixture of dihydroxy compounds consisting essentially of (a21) from 15 to 99.3 mol % of a dihydroxy compound selected from the group consisting of $C_2$–$C_6$-alkanediols and $C_5$–$C_{10}$-cycloalkanediols, (a22) from 0.2 to 85 mol % of a dihydroxy compound containing ether functionalities of the formula I

   I where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and (a24) from 0 to 50 mol % of a diamino-$C_1$–$C_8$-alkane,
(a25) from 0 to 50 mol % of a 2,2'-bisoxazoline of the formula II

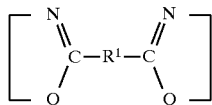

where $R^1$ is a single bond, a $(CH_2)_q$ alkylene group with q=2, 3 or 4, or a phenylene group, where the total of the individual mole percentages is 100 mol %,
where the molar ratio of (a1) to (a2) is selected in the range from 0.4:1 to 1.5:1,
with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1,
(c2) 0.01–50% by weight, based on (c1), of amino carboxylic acid B1,
where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

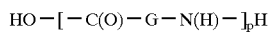  IIIa

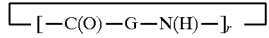  IIIb where p is an integer from 1 to 1500 and r is an integer from 1 to 4, and G is a radical which is selected from the group consisting of phenylene, —$(CH_2)_n$—, where n is an integer from 1 to 12, —$C(R^2)H$— and —$C(R^2)HCH_2$—, where $R^2$ is methyl or ethyl, and polyoxazolines with the repeating unit IV

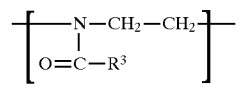  IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and
(c3) 0–5 mol %, based on the molar amount of component (a1) used for the preparation of P1, of compound D
and in a second step reacting Q1 with (e1) 0.1–5% by weight, based on the polyetheresteramide Q1, of diisocyanate C1 and with (e2) 0–5 mol %, based on the molar amount of component (a1) used for the preparation of Q1, of compound D.

19. A process for preparing the biodegradable polymers T2 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight of polymer T2 at 25° C.) and a melting point in the range from 50° to 255° C., which comprises in a first step reacting polyetheresteramide Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., obtained by reacting a mixture consisting essentially of
(d1) from 95 to 99.9% by weight of polyetheresteramide P1 by reacting a mixture consisting essentially of
(a1) a mixture consisting essentially of 20–95 mol % of adipic acid or ester-forming derivatives thereof or mixtures thereof,
5–80 mol % of terephthalic acid or ester-forming derivatives thereof or mixtures thereof, and
0–5 mol % of a compound containing sulfonate groups, where the total of the individual mole percentages is 100 mol %, and
(a2) a mixture of dihydroxy compounds consisting essentially of
(a21) from 15 to 99.3 mol % of a dihydroxy compound selected from the group consisting of $C_2$–$C_6$-alkanediols and $C_5$–$C_{10}$-cycloalkanediols,
(a22) from 0.2 to 85 mol % of a dihydroxy compound containing ether functionalities of the formula I

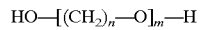  I where n is 2, 3 or 4 and m is an integer from 2 to 250, or mixtures thereof,
(a23) from 0.5 to 80 mol % of an amino-$C_2$–$C_{12}$-alkanol or amino-$C_5$–$C_{10}$-cycloalkanol, and
(a24) from 0 to 50 mol % of a diamino-$C_1$–$C_8$-alkane,
(a25) from 0 to 50 mol % of a 2,2'-bisoxazoline of the formula II

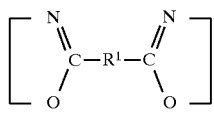  II where $R^1$ is a single bond, a $(CH_2)_q$ alkylene group with q=2, 3 or 4, or a phenylene group, where the total of the individual mole percentages is 100 mol %,
where the molar ratio of (a1) to (a2) is selected in the range from 0.4:1 to 1.5:1,
with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1,
(d2) from 0.1 to 5% by weight of a diisocyanate C1 and
(d3) from 0 to 5 mol %, based on the molar amount of component (a1) used for the preparation of P1, of compound D
and in a second step reacting Q2 with
(f1) 0.01–50% by weight, based on polyetheresteramide Q2, of amino carboxylic acid B1,
where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

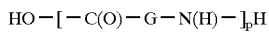  IIIa

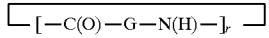  IIIb where p is an integer from 1 to 1500 and r is an integer from 1 to 4, and G is a radical which is selected from the group consisting of phenylene, $-(CH_2)_n-$, where n is an integer from 1 to 12, $-C(R^2)H-$ and $-C(R^2)HCH_2$, where $R^2$ is methyl or ethyl,
and polyoxazolines with the repeating unit IV

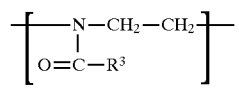  IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, and with (f2) 0–5 mol %, based on the molar amount of component (a1) used for the preparation of polyetheresteramide Q2, of compound D.

20. A process for preparing the biodegradable polymers T3 with a molecular weight ($M_n$) in the range from 8000 to 80,000 g/mol, with a viscosity number in the range from 30 to 450 g/ml (measured in o-dichlorobenzene/phenol (50/50 ratio by weight) at a concentration of 0.5% by weight of polymer T3 at 25° C.) and a melting point in the range from 50° to 255° C., which comprises in a first step preparing (g1) polyetheresteramide P2 obtained by reacting a mixture consisting essentially of (b1) a mixture consisting essentially of
20–95 mol % of adipic acid or ester-forming derivatives thereof or mixtures thereof,
5–80 mol % of terephthalic acid or ester-forming derivatives thereof or mixtures thereof, and
0–5 mol % of a compound containing sulfonate groups, where the total of the individual mole percentages is 100 mol %, (b2) a mixture (a2), of dihydroxy compounds, consisting essentially of
(a21) from 15 to 99.3 mol % of a dihydroxy compound selected from the group consisting of $C_2$–$C_6$-alkanediols and $C_5$–$C_{10}$-cycloalkanediols,
(a22) from 0.2 to 85 mol % of a dihydroxy compound containing ether functionalities of the formula I

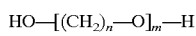  I where n is 2, 3 or 4 and m is an integer from 2 to 250, or mixtures thereof,
(a23) from 0.5 to 80 mol % of an amino-$C_2$–$C_{12}$-alkanol or amino-$C_5$–$C_{10}$-cycloalkanol, and
(a24) from 0 to 50 mol % of a diamino-$C_1$–$C_8$-alkane,
(a25) from 0 to 50 mol % of a 2,2'-bisoxazoline of the formula II

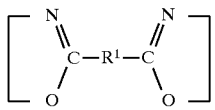  II where R1 is a single bond, a $(CH_2)_q$ alkylene group with q=2, 3 or 4, or a phenylene group, where the total of the individual mole percentages is 100 mol %, where the molar ratio of (b1) to (b2) is selected in the range from 0.4:1 to 1.25:1,
(b3) from 0.01 to 40% by weight, based on component (b1), of an amino carboxylic acid B1, and
(b4) from 0 to 5 mol %, based on component (b1), of compound D with at least three groups capable of ester formation, where the amino carboxylic acid B1 is selected from the group consisting of the natural amino acids, polyamides with a molecular weight not exceeding 18,000 g/mol, obtained by polycondensation of a dicarboxylic acid with 4 to 6 carbon atoms and a diamine with 4 to 10 carbon atoms and compounds which are defined by the formulae IIIa and IIIb

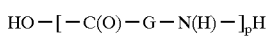  IIIa

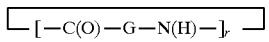  IIIb where p is an integer from 1 to 1500 and r is an integer from 1 to 4, and G is a radical which is selected from the group consisting of phenylene, $-(CH_2)_n-$, where n is an integer from 1 to 12, $-C(R^2)H-$ and $-C(R^2)HCH_2$, where $R^2$ is methyl or ethyl,
and polyoxazolines with the repeating unit IV

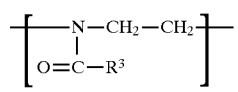  IV where $R^3$ is hydrogen, $C_1$–$C_6$-alkyl, $C_5$–$C_8$-cycloalkyl, phenyl which is unsubstituted or substituted up to three times by $C_1$–$C_4$-alkyl groups, or tetrahydrofuryl, where the polyesteramide P2 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P2 at 25° C.) and a melting point in the range from 50° to 255° C., or (g2) a mixture consisting essentially of polyetheresteramide P1 obtained by reacting a mixture consisting essentially of (a1) a mixture consisting essentially of 20–95 mol % of adipic acid or ester-forming derivatives thereof or mixtures thereof,
5–80 mol % of terephthalic acid or ester-forming derivatives thereof or mixtures thereof, and
0–5 mol % of a compound containing sulfonate groups, where the total of the individual mole percentages is 100 mol %, and (a2),
where the molar ratio of (a1) to (a2) is selected in the range from 0.4:1 to 1.5:1,
with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D used for the preparation of the polyetheresteramides P1 and 0.01–50% by weight, based on polyetheresteramide P1, of amino carboxylic acid B1, or
(g3) a mixture consisting essentially of polyetheresteramides P1 which differ from one another in composition, and in a second step reacting (g1) or (g2) or (g3)

with 0.1–5% by weight, based on the amount of the polyetheresteramides used, of diisocyanate C1 and with 0–5 mol %, based on the particular molar amounts of component (a1) used for the preparation of the polyetheresteramides (g1) to (g3) used, of compound D.

21. A process for preparing the biodegradable thermoplastic molding compositions T4, which comprises in a first step preparing polyetheresteramide P1 obtained by reacting a mixture consisting essentially of (a1) a mixture consisting essentially of 20–95 mol % of adipic acid or ester-forming derivatives thereof or mixtures thereof, 5–80 mol % of terephthalic acid or ester-forming derivatives thereof or mixtures thereof, and 0–5 mol % of a compound containing sulfonate groups, where the total of the individual mole percentages is 100 mol %, and (a2) a mixture of dihydroxy compounds consisting essentially of (a21) from 15 to 99.3 mol % of a dihydroxy compound selected from the group consisting of $C_2$–$C_6$-alkanediols and $C_5$–$C_{10}$-cycloalkanediols, (a22) from 0.2 to 85 mol % of a dihydroxy compound containing ether functionalities of the formula I

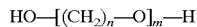

HO—[(CH$_2$)$_n$—O]$_m$—H      I where n is 2, 3 or 4 and m is an integer from 2 to 250, or mixtures thereof, (a23) from 0.5 to 80 mol % of an amino-$C_2$–$C_{12}$-alkanol or amino-$C_5$–$C_{10}$-cycloalkanol, and (a24) from 0 to 50 mol % of a diamino-$C_1$–$C_8$-alkane, (a25) from 0 to 50 mol % of a 2,2'-bisoxazoline of the formula II

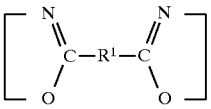

where $R^1$ is a single bond, a $(CH_2)_q$ alkylene group with q=2, 3 or 4, or a phenylene group, where the total of the individual mole percentages is 100 mol %, where the molar ratio of (a1) to (a2) is selected in the range from 0.4:1 to 1.5:1, with the proviso that the polyetheresteramide P1 has a molecular weight ($M_n$) in the range from 5000 to 80,000 g/mol, a viscosity number in the range from 30 to 450 g/ml (measured in o-dichlorobenzene/phenol (50/50 ratio by weight) at a concentration of 0.5% by weight of polyetheresteramide P1 at 25° C.) and a melting point in the range from 50° to 200° C., and with the further proviso that from 0 to 5 mol %, based on the molar amount of component (a1) used, of a compound D with at least three groups capable of ester formation is used to prepare the polyetheresteramides P1 or polyetheresteramide Q2 with a molecular weight ($M_n$) in the range from 6000 to 80,000 g/mol, a viscosity number in the range from 30 to 450 g/ml (measured in o-dichlorobenzene/phenol (50/50 ratio by weight) at a concentration of 0.5% by weight of polyetheresteramide Q2 at 25° C.) and a melting point in the range from 50° to 200° C., obtained by reacting a mixture consisting essentially of (d1) from 95 to 99.9% by weight of polyetheresteramide P1, (d2) from 0.1 to 5% by weight of a diisocyanate C1 and (d3) from 0 to 5 mol %, based on the molar amount of component (a1) used for the preparation of P1, of compound D and in a second step mixing 99.5–0.5% by weight of P1 or Q2 with 0.5–99.5% by weight of hydroxy carboxylic acid H1.

\* \* \* \* \*

UNITED STATES PATENT AND TRADEMARK OFFICE
CERTIFICATE OF CORRECTION

PATENT NO. : 5,880,220
DATED : March 9, 1999
INVENTOR(S) : WARZELHAN et al.

It is certified that error appears in the above-identified patent and that said Letters Patent is hereby corrected as shown below:

Col. 19, claim 4, line 44, delete "obtainable" and substitute --obtained--.

Col. 20, claim 4, line 14, "(e')" should be --(e1)--.

Col. 20, claim 5, line 47, after "compounds" insert --which--.

Col. 26, claim 16, line 39, "$C_1$-C8-alkane," should be --$C_1$-$C_8$-alkane,--.

Col. 30, claim 19, line 9, after "P1" insert -- obtained--.

Signed and Sealed this

Seventeenth Day of August, 1999

Attest:

Q. TODD DICKINSON

Attesting Officer

Acting Commissioner of Patents and Trademarks